(12) United States Patent
Wu et al.

(10) Patent No.: US 9,785,038 B2
(45) Date of Patent: Oct. 10, 2017

(54) TILT-TYPE ANTI-SHAKE COMPENSATION STRUCTURE FOR AUTO-FOCUS

(71) Applicant: TDK TAIWAN Corporation, Taipei (TW)

(72) Inventors: Fu-Yuan Wu, Yangmei Taoyuan (TW); Chao-Chang Hu, Yangmei Taoyuan (TW); Yi-Liang Chan, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 369 days.

(21) Appl. No.: 14/223,100

(22) Filed: Mar. 24, 2014

(65) Prior Publication Data

US 2014/0205274 A1    Jul. 24, 2014

Related U.S. Application Data

(62) Division of application No. 12/910,519, filed on Oct. 22, 2010, now Pat. No. 8,982,464.

(51) Int. Cl.
*G02B 27/64* (2006.01)
*G02B 7/02* (2006.01)
*G03B 17/00* (2006.01)
*G02B 7/04* (2006.01)

(52) U.S. Cl.
CPC ............... *G03B 17/00* (2013.01); *G02B 7/04* (2013.01); *G02B 27/646* (2013.01)

(58) Field of Classification Search
CPC . G02B 7/00; G02B 7/003; G02B 7/02; G02B 7/023; G02B 7/04; G02B 7/09; G02B 7/28; G02B 7/285; G02B 27/64; G02B 27/646; G03B 17/00
See application file for complete search history.

(56) References Cited

U.S. PATENT DOCUMENTS

| 5,637,861 | A | 6/1997 | Okada et al. |
|---|---|---|---|
| 6,086,209 | A | 7/2000 | Miyahara et al. |
| 6,388,789 | B1 | 5/2002 | Bernstein |
| 6,949,996 | B2 | 9/2005 | Matsumoto et al. |
| 7,400,463 | B1 | 7/2008 | Wu |
| 7,881,598 | B1 | 2/2011 | Wu et al. |
| 8,982,464 | B2 * | 3/2015 | Chan .................... G02B 27/646 359/554 |

(Continued)

*Primary Examiner* — Thong Nguyen
(74) *Attorney, Agent, or Firm* — Muncy, Geissler, Olds & Lowe, P.C.

(57) ABSTRACT

A tilt-type anti-shake compensation structure for auto-focus module includes an auto-focus module having a lens assembly held thereto and driving the latter to move forward and rearward in a light entering path, i.e. in z-axis direction, so as to focus a captured image; an outer frame enclosing the auto-focus module therein, and having an elastic supporting member provided therein to connect to and between upper ends of the outer frame and the auto-focus module; and a compensation driving unit arranged behind the auto-focus module for driving the auto-focus module to tilt leftward and rightward on x-axis, or forward and rearward on y-axis, within the outer frame, so as to compensate any image deviation due to shake caused by hands. The anti-shake structure is simple and can quickly compensate shake caused by hands.

10 Claims, 6 Drawing Sheets

(56) References Cited

U.S. PATENT DOCUMENTS

| | | | |
|---|---|---|---|
| 2008/0187301 A1* | 8/2008 | Takahashi | G03B 5/00 |
| | | | 396/55 |
| 2010/0080545 A1 | 4/2010 | Fan et al. | |
| 2011/0075999 A1 | 3/2011 | Chiu | |
| 2011/0110571 A1 | 5/2011 | Bar-Shalev | |
| 2011/0217029 A1* | 9/2011 | Wu | G03B 17/00 |
| | | | 396/55 |
| 2015/0168679 A1* | 6/2015 | Yeo | G03B 5/00 |
| | | | 348/360 |

* cited by examiner

TILT-TYPE ANTI-SHAKE COMPENSATION STRUCTURE FOR AUTO-FOCUS

CROSS-REFERENCE TO RELATED APPLICATION

This application is a Divisional of co-pending application Ser. No. 12/910,519, filed on Oct. 22, 2010, for which priority is claimed under 35 U.S.C. §120, the entire contents of which are hereby incorporated by reference.

FIELD OF THE INVENTION

The present invention relates to a tilt-type anti-shake compensation structure for auto-focus module, and more particularly to a tilt-type anti-shake compensation structure that allows an auto-focus module to tilt forward and rearward or leftward and rightward to thereby precisely compensate shake caused by hands.

BACKGROUND OF THE INVENTION

With the progress in scientific technologies and the modularization and miniaturization of camera lens, it is now possible to produce digital cameras having a very small volume, and most of currently available mobile phones are provided with the function of a digital camera. On the other hand, to highlight the differences between the advanced camera devices and the low-level camera devices, higher image quality and more functions, such as highly increased pixels, multi-point auto-focus (AF) function, anti-shake (AS) function, etc., have been further added to the advanced camera devices.

However, every new function added to the image capturing module of a camera device would necessitate the increase of a corresponding modular mechanism to thereby increase the volume of the image capturing module. Therefore, it has become a target of all image capturing module manufacturers to further reduce the volume of the capturing module that has more functions.

There are various types of auto-focus driving structures for the conventional miniature lens. Among others, the voice coil motor (VCM) is the currently most widely employed auto-focus driving structure. The VCM includes an assembly of coils, magnets and plate springs to hold a lens thereto, so that the lens is able to move forward and rearward in an optical axis direction to thereby achieve the object of auto focusing or zooming. The VCM has the advantages of small volume, low power consumption, accurately actuated displacement, and cost-effective, and is therefore very suitable for short-distance driving in miniature lens auto-focusing.

With respect to the anti-shake function, it is achieved mainly through several ways. For example, the imaging element can utilize a compensation movement of a mechanism supporting frame to offset the influence of shake during shooting picture on the forming of a blurred image. Or, the lens can be provided with a mechanical structure to eliminate the shake. Or, two gyro sensors can be used to detect any vibration of the imaging element in horizontal and vertical directions, and use push by magnetic force to compensate such vibration.

Figure 1:
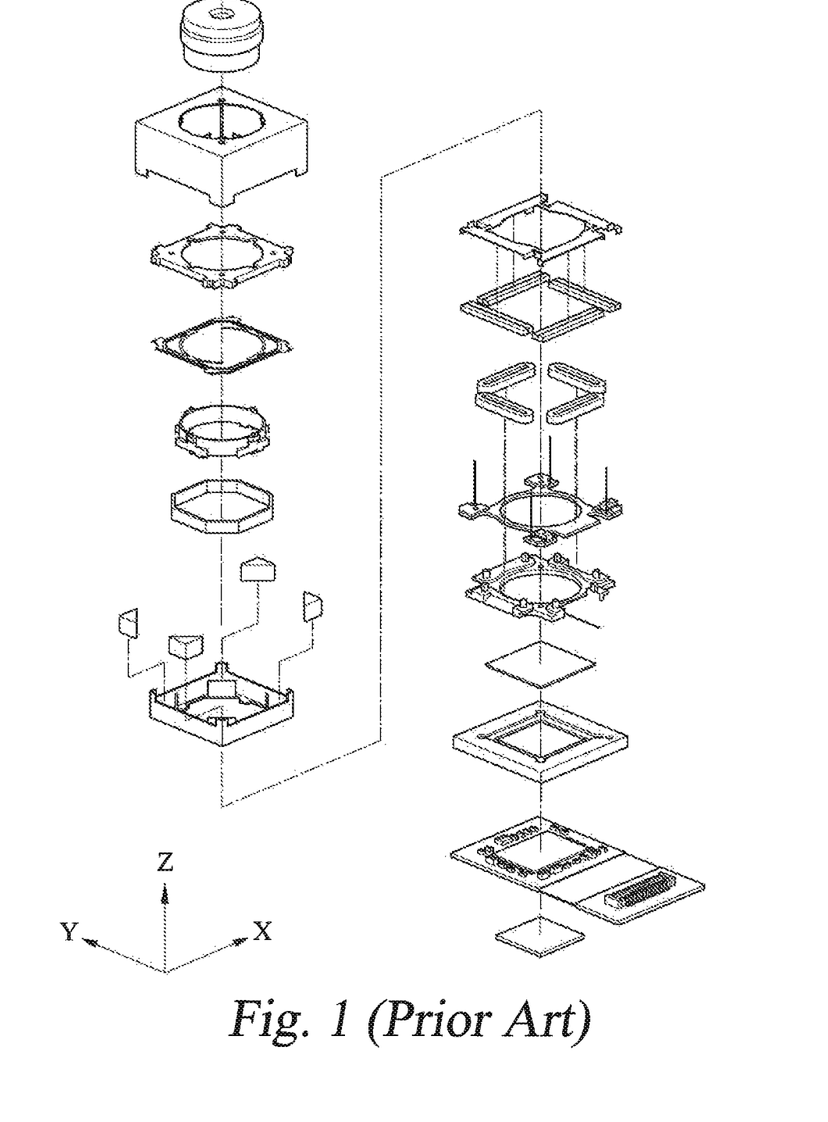
FIG. 1 is an exploded perspective view of an anti-shake auto-focus modular structure disclosed in U.S. patent application Ser. No. 12/630,688.

The same inventor of the present invention filed U.S. patent application Ser. No. 12/630,688 entitled "Anti-shake Auto-focus Modular Structure" on Dec. 3, 2009, and FIG. 1 is an exploded perspective view of the anti-shake auto-focus modular structure disclosed therein. According to the above-mentioned invention, a movement signal generated by a shake sensor is used to drive the whole auto-focus module to instantaneously move horizontally in x-axis or y-axis direction, so as to compensate any shake caused by hands.

Now, based on the structural design of the above-mentioned invention, the inventor further designs a new anti-shake structure for auto-focus module. Unlike the above-mentioned invention that teaches the horizontal movement of the whole auto-focus module in x-axis direction or y-axis direction to compensate any shake, the new anti-shake structure in the present invention uses a center of the auto-focus module as a fulcrum to tilt the auto-focus module leftward, rightward, forward or rearward for compensating any shake caused by hands, the anti-shake structure is therefore simpler and the effect of shake compensation can be produced more quickly to satisfy the requirement for an advanced camera lens module.

SUMMARY OF THE INVENTION

A primary object of the present invention is to provide a tilt-type anti-shake compensation structure for auto-focus module, which allows the auto-focus module to use a center thereof as a fulcrum to tilt forward, rearward, leftward or rightward, in order to compensate shake caused by hands, making the anti-shake structure simpler and more efficient.

To achieve the above and other objects, a tilt-type anti-shake compensation structure for auto-focus module is provided and comprises: an auto-focus module having a lens assembly held thereto, a plurality of magnetic elements arranged around an outer periphery of the auto-focus module and at least one spring plate connected between the lens assembly and the magnetic elements, the auto-focus module configured to drive the lens assembly to move upward and downward in a light entering path along a z-axis direction, so as to focus an image captured by the lens assembly; an outer frame enclosing the auto-focus module therein, and having an elastic supporting member provided therein to connect to and between an upper end of the outer frame and an upper end of the auto-focus module for suspending the auto-focus module in the outer frame, allowing the auto-focus module to tilt forward and rearward along an x-axis or leftward and rightward along a y-axis by fulcruming a center of the elastic supporting member; wherein the x-axis, the y-axis and the z-axis are vertical to each other, and a compensation driving unit; wherein the compensation driving unit includes: a compensation coil assembly being arranged on an inner wall surface of the outer frame, and including at least one x-axis compensation coil and at least one y-axis compensation coil separately corresponding to one of the magnetic elements of the auto-focus module for respectively generating an electromagnetic field to drive the auto-focus module to tilt on x-axis or y-axis; and a displacement sensor being arranged on an inner bottom face of the outer frame, and including an x-axis sensor and a y-axis sensor separately corresponding to the magnetic elements of the auto-focus module for detecting a volume of displacement in x-axis direction or y-axis direction, so that the auto-focus module can be driven to reach at a precise compensation position. To achieve the above and other objects, a tilt-type anti-shake compensation structure for auto-focus module is provided and comprises: an auto-focus module having a lens assembly held thereto, a plurality of magnetic elements arranged around an outer periphery of the auto-focus module and at least one spring plate connected between the lens assembly and the magnetic elements, the auto-focus module configured to drive the lens assembly to move upward and downward in a light entering path along a z-axis direction, so as to focus an image captured by the lens assembly; an outer frame enclosing the auto-focus module therein, and having an elastic supporting member provided therein to connect to and between an upper end of the outer frame and an upper end of the auto-focus module for suspending the auto-focus module in the outer frame, allowing the auto-focus module to tilt forward and rearward along an x-axis or leftward and rightward along a y-axis by fulcruming a center of the elastic supporting member wherein the x-axis, the y-axis and the z-axis are vertical to each other; and a compensation driving unit; wherein the compensation driving unit includes: a compensation magnet assembly being arranged on an outer lower end of the auto-focus module, and including at least one x-axis compensation magnet and at least one y-axis compensation magnet; a compensation coil assembly being arranged on an inner wall surface of the outer frame, and including at least one x-axis compensation coil and at least one y-axis compensation coil corresponding to the x-axis compensation magnet and the y-axis compensation magnet, respectively, for separately generating an electromagnetic field to drive the auto-focus module to tilt on x-axis or y-axis; and a displacement sensor assembly being arranged on an inner bottom face of the outer frame, and including an x-axis sensor and a y-axis sensor corresponding to the x-axis compensation magnet and the y-axis compensation magnet, respectively, for detecting a volume of displacement in x-axis direction or y-axis direction, so that the auto-focus module can be driven to reach at a precise compensation position.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings. It is understood the accompanying drawings are illustrated only for assisting in describing the present invention and not intended to limit the present invention. For the purpose of easy to understand, elements that are the same in the preferred embodiments are denoted by the same reference numerals.

Figure 2:
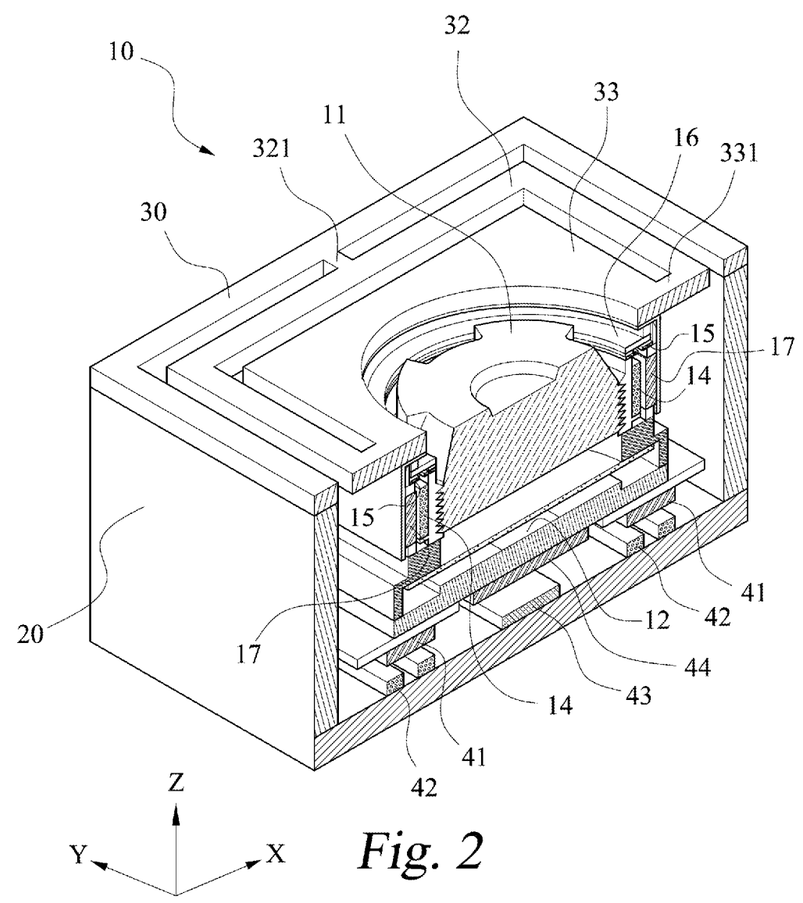
FIG. 2 is a sectional perspective view of a tilt-type anti-shake compensation structure for auto-focus module according to a first embodiment of the present invention.
Figure 3:
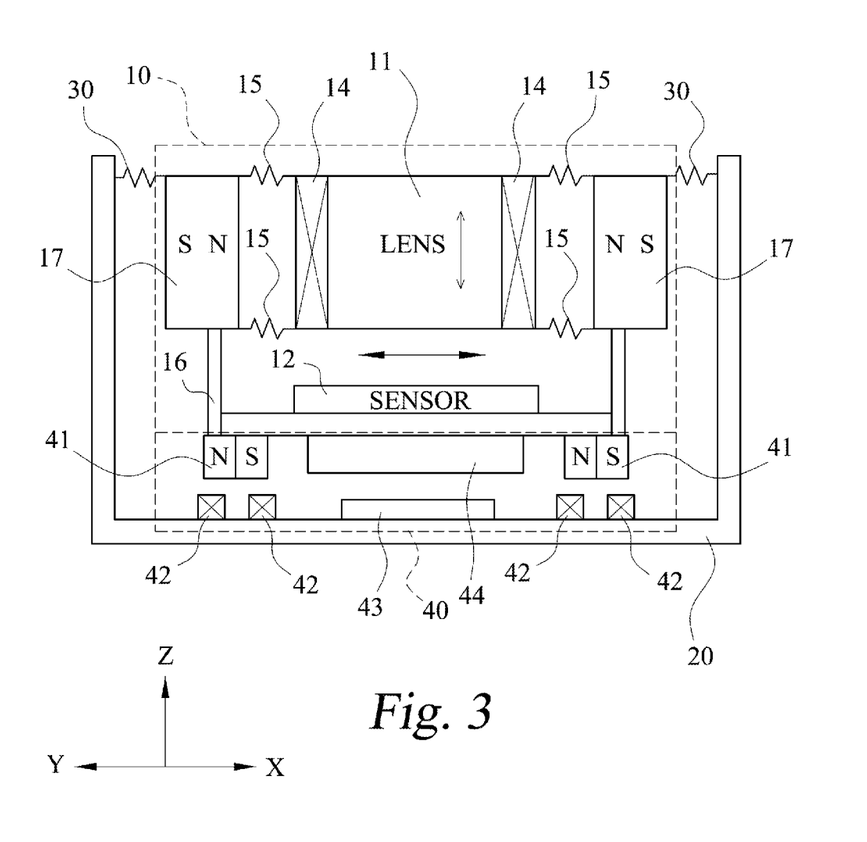
FIG. 3 is a schematic plan view of FIG. 2.

Please refer to FIG. 2 that is a partial sectional perspective view of a tilt-type anti-shake compensation structure for auto-focus module according to a first embodiment of the present invention; and to FIG. 3 that is a schematic plan view of FIG. 2. The present invention uses a center of an auto-focus module as a fulcrum to tilt the auto-focus module leftward and rightward on x-axis or forward and rearward on y-axis for compensating any shake caused by hands, so as to improve the anti-shake auto-focus modular structure disclosed in U.S. patent application Ser. No. 12/630,688 that horizontally moves an auto-focus module in x-axis or y-axis direction for compensating any shake caused by hands while shooting a picture.

The tilt-type anti-shake compensation structure for auto-focus module according to the first embodiment of the present invention includes an auto-focus module 10, an outer frame 20, an elastic supporting member 30, a compensation driving unit 40, and a shake sensor (not shown). A lens 11 is held to the auto-focus module 10 for capturing light and image. The lens 11 and an image sensor 12 are aligned with each other on z-axis, that is, on a line along which light enters into the lens 11. The auto-focus module 10 drives the lens 11 to move forward and rearward in the light entering path (i.e. z-axis direction), so that the lens 11 can focus the captured image on the image sensor 12.

The auto-focus module 10 is preferably a driving structure formed of a voice coil motor (VCM); and includes a lens holder for holding and locking the lens 11 thereto. A coil 14 is arranged around the lens holder, and the lens holder is connected to a movable portion of at least one plate spring 15, while the at least one plate spring 15 is connected at a fixed portion thereof to a base 16. Four magnets 17 are arranged in the base 16 corresponding to the coil 14.

The outer frame 20 encloses the auto-focus module 10. The elastic supporting member 30 is arranged on an inner upper end of the outer frame 20 and connected to an upper end of the auto-focus module 10, so as to suspend the auto-focus module 10 in the outer frame 20. With the elastic supporting member 30 arranged in the above-described manner, the auto-focus module 10 is allowed to tilt forward and rearward or leftward and rightward with a center of the elastic supporting member 30 acting as a fulcrum.

Figure 4:
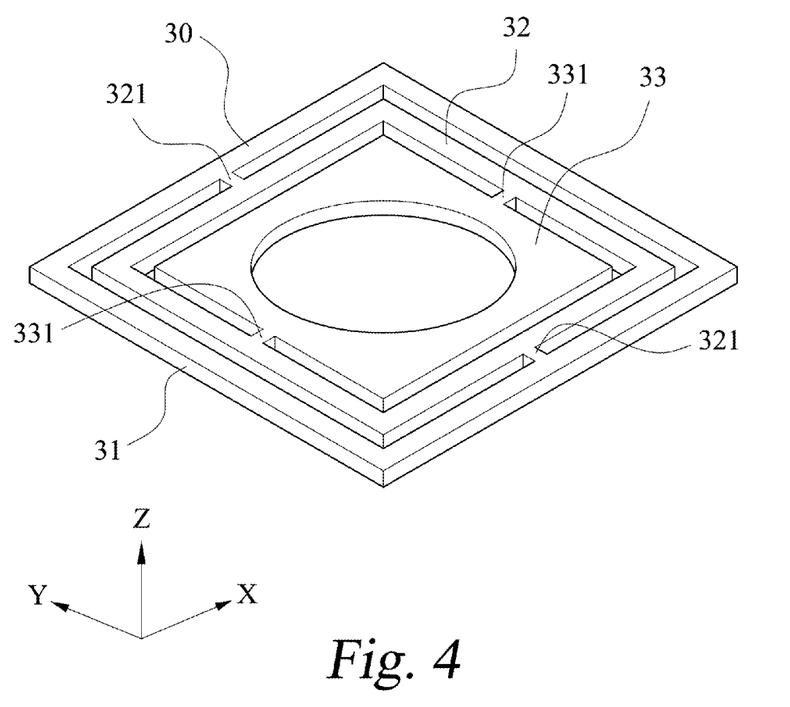
FIG. 4 is a perspective view showing an embodiment of an elastic supporting member used in the present invention.

Please refer to FIG. 4 that is a perspective view showing an embodiment of an elastic supporting member used in the present invention. As shown, the elastic supporting member 30 includes an outer fixed portion 31, a first inner movable portion 32, and a second inner movable portion 33. The outer fixed portion 31 is fixedly connected to the inner upper end of the outer frame 20; the first inner movable portion 32 is located at an inner side of the outer fixed portion 31, and is connected at two opposite and symmetrical first support points 321 to the outer fixed portion 31; and the second inner movable portion 33 is located at an inner side of the first inner movable portion 32, and is connected at two opposite and symmetrical second support points 331 to the first inner movable portion 32. It is noted the two second support points 331 are respectively located at an angular position of 90 degrees relative to the first support points 321, and the second inner movable portion 33 is connected to the upper end of the auto-focus module 10.

The first inner movable portion 32 allows the auto-focus module 10 to tilt leftward and rightward on x-axis; and the second inner movable portion 33 allows the auto-focus module 10 to tilt forward and rearward on y-axis. Alternatively, the present invention can be differently designed for the first inner movable portion 32 to allow the auto-focus module 10 to tilt forward and rearward on y-axis; and for the second inner movable portion 33 to allow the auto-focus module 10 to tilt leftward and rightward on x-axis.

Please refer to FIGS. 2 and 3 at the same time again. The compensation driving unit 40 is located behind the auto-focus module 10 for driving the auto-focus module 10 to tilt leftward and rightward on x-axis or forward and rearward on y-axis within the outer frame 20, so as to compensate any image deviation due to shake caused by hands.

The compensation driving unit 40 includes a compensation magnet assembly 41, a compensation coil assembly 42, and a displacement sensor assembly. The compensation magnet assembly 41 is arranged beneath an outer bottom face of the auto-focus module 10, and includes at least one x-axis compensation magnet and at least one y-axis compensation magnet.

The compensation coil assembly 42 is arranged on an inner bottom face of the outer frame 20, and includes at least one x-axis compensation coil and at least one y-axis compensation coil corresponding to the x-axis compensation magnet and the y-axis compensation magnet, respectively, for separately generating an electromagnetic field to drive the auto-focus module 10 to tilt on x-axis or y-axis.

The displacement sensor assembly is arranged on a central area of the inner bottom face of the outer frame 20, and includes a displacement sensor 43 and a sensing magnet 44. Preferably, the displacement sensor 43 is a two-axis sensing IC. The displacement sensor 43 corresponds to the sensing magnet 44 for detecting a volume of displacement in x-axis direction or y-axis direction, so that the auto-focus module 10 can be driven to reach at a precise compensation position.

Preferably, the displacement sensor 43 can be a Hall sensor, a magneto-resistive (MR) sensor, a fluxgate sensor, an optical position sensor, or an optical encoder.

An advanced hand-held device is generally provided with a shake sensor, such as a Gyro sensor, an accelerometer, etc., for generating a shake signal in response to any shake of the hand-held device and sending the shake signal to the compensation driving unit for use as a basis to determine an angle by which the auto-focus module should be driven to tilt on x-axis or y-axis. The present invention may utilize the shake sensor provided in the advanced hand-held device in the case the present invention is provided on the hand-held device. Alternatively, the tilt-type anti-shake compensation structure of the present invention can be directly provided with a shake sensor.

Figure 5:
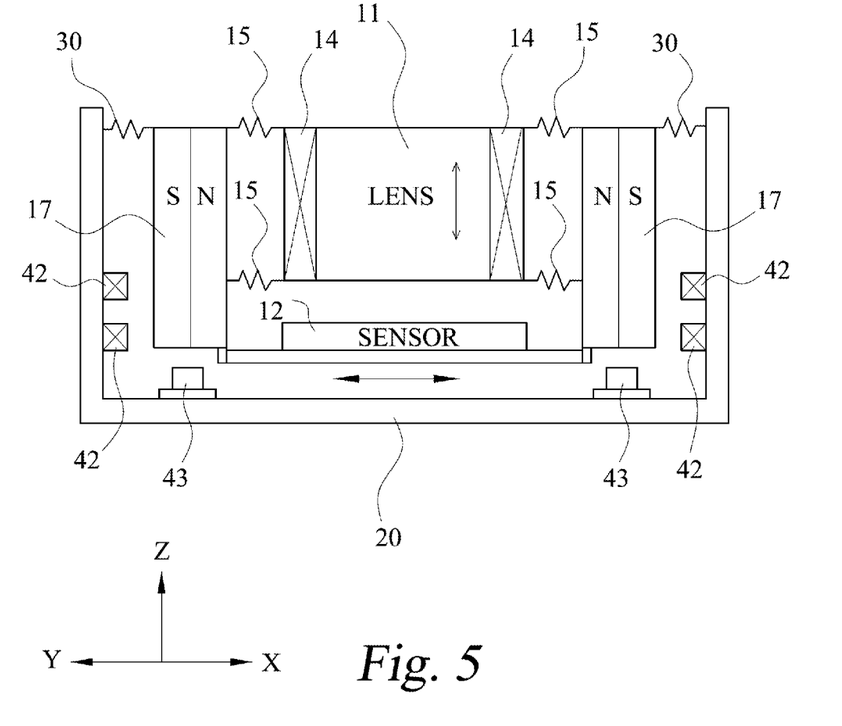
FIG. 5 is a schematic plan view of a tilt-type anti-shake compensation structure for auto-focus module according to a second embodiment of the present invention.

FIG. 5 is a schematic plan view of a tilt-type anti-shake compensation structure for auto-focus module according to a second embodiment of the present invention. In the second embodiment, the compensation driving unit 40 includes a compensation coil assembly 42, and a displacement sensor 43. And, the magnets 17 in the auto-focus module 10 are also used as the compensation magnet assembly. That is, the compensation driving unit 40 and the auto-focus module 10 use the same set of magnets.

The compensation coil assembly 42 is arranged on an inner wall surface of the outer frame 20, and includes at least one x-axis compensation coil and at least one y-axis compensation coil separately corresponding to one of the magnets 17 in the auto-focus module 10 for respectively generating an electromagnetic field to drive the auto-focus module 10 to tilt on x-axis or y-axis.

The displacement sensor 43 is arranged on the inner bottom face of the outer frame 20, and includes an x-axis sensor and a y-axis sensor separately corresponding to one of the magnets 17 in the auto-focus module 10 for detecting a volume of displacement in x-axis direction or y-axis direction, so that the auto-focus module 10 can be driven to reach at a precise compensation position.

Figure 6:
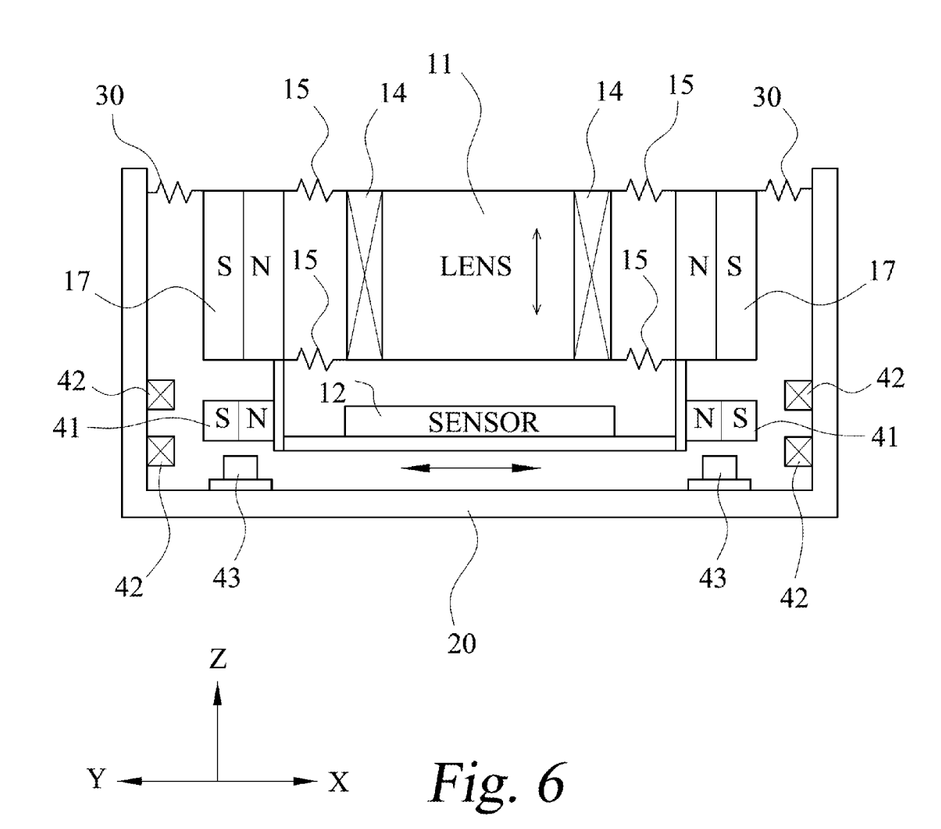
FIG. 6 is a schematic plan view of a tilt-type anti-shake compensation structure for auto-focus module according to a third embodiment of the present invention.

FIG. 6 is a schematic plan view of a tilt-type anti-shake compensation structure for auto-focus module according to a third embodiment of the present invention. In the third embodiment, the compensation driving unit 40 includes a compensation magnet assembly 41, a compensation coil assembly 42, and a displacement sensor 43. The compensation magnet assembly 41 is arranged on an outer lower end of the auto-focus module 10, and includes at least one x-axis compensation magnet and at least one y-axis compensation magnet.

The compensation coil assembly 42 is arranged on an inner lower end of the outer frame 20, and includes at least one x-axis compensation coil and at least one y-axis compensation coil corresponding to the x-axis compensation magnet and the y-axis compensation magnet, respectively, for separately generating an electromagnetic field to drive the auto-focus module to tilt on x-axis or y-axis.

The displacement sensor 43 is arranged on the inner bottom face of the outer frame 20, and includes an x-axis sensor and a y-axis sensor corresponding to the x-axis compensation magnet and the y-axis compensation magnet, respectively, for detecting a volume of displacement in x-axis direction or y-axis direction, so that the auto-focus module 10 can be driven to reach at a precise compensation position.

The present invention has been described with some preferred embodiments thereof and it is understood that many changes and modifications in the described embodiments can be carried out without departing from the scope and the spirit of the invention that is intended to be limited only by the appended claims.

The invention claimed is:

1. A tilt-type anti-shake compensation structure for auto-focus module, comprising:
   an auto-focus module having a lens assembly held thereto, a plurality of magnetic elements arranged around an outer periphery of the auto-focus module and at least one spring plate connected between the lens assembly and the magnetic elements, the auto-focus module configured to drive the lens assembly to move upward and downward in a light entering path along a z-axis direction, so as to focus an image captured by the lens assembly;
   an outer frame enclosing the auto-focus module therein, and having an elastic supporting member provided therein to connect to and between an upper end of the outer frame and an upper end of the auto-focus module for suspending the auto-focus module in the outer frame, allowing the auto-focus module to tilt forward and rearward along an x-axis or leftward and rightward along a y-axis by fulcruming a center of the elastic supporting member; wherein the x-axis, the y-axis and the z-axis are vertical to each other, and
   a compensation driving unit;
   wherein the compensation driving unit includes:
   a compensation coil assembly being arranged on an inner wall surface of the outer frame, and including at least one x-axis compensation coil and at least one y-axis compensation coil separately corresponding to one of the magnetic elements of the auto-focus module for respectively generating an electromagnetic field to drive the auto-focus module to tilt on x-axis or y-axis; and
   a displacement sensor being arranged on an inner bottom face of the outer frame, and including an x-axis sensor and a y-axis sensor separately corresponding to the magnetic elements of the auto-focus module for detecting a volume of displacement in x-axis direction or y-axis direction, so that the auto-focus module can be driven to reach at a precise compensation position.

2. The tilt-type anti-shake compensation structure for auto-focus module as claimed in claim 1, wherein the elastic supporting member further includes:
   an outer fixed portion being fixedly connected to the upper end of the outer frame;
   a first inner movable portion being located at an inner side of the outer fixed portion, and connected at two opposite and symmetrical first support points to the outer fixed portion; and
   a second inner movable portion being located at an inner side of the first inner movable portion, and connected at two opposite and symmetrical second support points to the first inner movable portion; the two second support points being respectively located at an angular position of 90 degrees relative to the first support points; and the second inner movable portion being connected to the upper end of the auto-focus module.

3. The tilt-type anti-shake compensation structure for auto-focus module as claimed in claim 2, wherein the first inner movable portion allows the auto-focus module to tilt on x-axis, and the second inner movable portion allows the auto-focus module to tilt on y-axis.

4. The tilt-type anti-shake compensation structure for auto-focus module as claimed in claim 2, wherein the first inner movable portion allows the auto-focus module to tilt on y-axis, and the second inner movable portion allows the auto-focus module to tilt on x-axis.

5. The tilt-type anti-shake compensation structure for auto-focus module as claimed in claim 1, wherein the x-axis sensor and the y-axis sensor are displacement sensors selected from the group consisting of a Hall sensor, a magneto-resistive sensor, a fluxgate sensor, an optical position sensor, and an optical encoder.

6. A tilt-type anti-shake compensation structure for auto-focus module, comprising:
   an auto-focus module having a lens assembly held thereto, a plurality of magnetic elements arranged around an outer periphery of the auto-focus module and at least one spring plate connected between the lens assembly and the magnetic elements, the auto-focus module configured to drive the lens assembly to move upward and downward in a light entering path along a z-axis direction, so as to focus an image captured by the lens assembly;
   an outer frame enclosing the auto-focus module therein, and having an elastic supporting member provided therein to connect to and between an upper end of the outer frame and an upper end of the auto-focus module for suspending the auto-focus module in the outer frame, allowing the auto-focus module to tilt forward and rearward along an x-axis or leftward and rightward along a y-axis by fulcruming a center of the elastic supporting member wherein the x-axis, the y-axis and the z-axis are vertical to each other; and
   a compensation driving unit;
   wherein the compensation driving unit includes:
   a compensation magnet assembly being arranged on an outer lower end of the auto-focus module, and including at least one x-axis compensation magnet and at least one y-axis compensation magnet;
   a compensation coil assembly being arranged on an inner wall surface of the outer frame, and including at least one x-axis compensation coil and at least one y-axis compensation coil corresponding to the x-axis compensation magnet and the y-axis compensation magnet, respectively, for separately generating an electromagnetic field to drive the auto-focus module to tilt on x-axis or y-axis; and
   a displacement sensor assembly being arranged on an inner bottom face of the outer frame, and including an x-axis sensor and a y-axis sensor corresponding to the x-axis compensation magnet and the y-axis compensation magnet, respectively, for detecting a volume of displacement in x-axis direction or y-axis direction, so that the auto-focus module can be driven to reach at a precise compensation position.

7. The tilt-type anti-shake compensation structure for auto-focus module as claimed in claim 6, wherein the elastic supporting member further includes:
   an outer fixed portion being fixedly connected to the upper end of the outer frame;
   a first inner movable portion being located at an inner side of the outer fixed portion, and connected at two opposite and symmetrical first support points to the outer fixed portion; and
   a second inner movable portion being located at an inner side of the first inner movable portion, and connected at two opposite and symmetrical second support points to the first inner movable portion; the two second support points being respectively located at an angular position of 90 degrees relative to the first support points; and the second inner movable portion being connected to the upper end of the auto-focus module.

8. The tilt-type anti-shake compensation structure for auto-focus module as claimed in claim 7, wherein the first inner movable portion allows the auto-focus module to tilt on x-axis, and the second inner movable portion allows the auto-focus module to tilt on y-axis.

9. The tilt-type anti-shake compensation structure for auto-focus module as claimed in claim 7, wherein the first inner movable portion allows the auto-focus module to tilt on y-axis, and the second inner movable portion allows the auto-focus module to tilt on x-axis.

10. The tilt-type anti-shake compensation structure for auto-focus module as claimed in claim 6, wherein the x-axis sensor and the y-axis sensor are displacement sensors selected from the group consisting of a Hall sensor, a magneto-resistive sensor, a fluxgate sensor, an optical position sensor, and an optical encoder.

* * * * *